United States Patent
Hedman et al.

(10) Patent No.: US 8,087,508 B2
(45) Date of Patent: Jan. 3, 2012

(54) TORSIONAL VIBRATION DAMPER HUB FOR A VEHICLE CLUTCH

(75) Inventors: Anders Hedman, Marstrand (SE); Ola Nilsson, Varberg (SE)

(73) Assignee: Volvo Lastvagnar AB, Göteborg (SE)

( * ) Notice: Subject to any disclaimer, the term of this patent is extended or adjusted under 35 U.S.C. 154(b) by 618 days.

(21) Appl. No.: 12/296,451

(22) PCT Filed: Apr. 19, 2006

(86) PCT No.: PCT/SE2006/000467
§ 371 (c)(1),
(2), (4) Date: Oct. 8, 2008

(87) PCT Pub. No.: WO2007/120088
PCT Pub. Date: Oct. 25, 2007

(65) Prior Publication Data
US 2009/0200133 A1 Aug. 13, 2009

(51) Int. Cl.
*F16D 3/14* (2006.01)
*F16F 15/121* (2006.01)
(52) U.S. Cl. .................................. 192/213.1; 464/68.7
(58) Field of Classification Search ............. 464/66.1, 464/68.1, 68.7; 192/55.61, 70.17, 206, 213.1
See application file for complete search history.

(56) References Cited

U.S. PATENT DOCUMENTS

| | | | | |
|---|---|---|---|---|
| 3,101,600 A | * | 8/1963 | Stromberg | 192/213.1 |
| 3,800,931 A | * | 4/1974 | Maucher | 192/70.17 |
| 4,347,717 A | * | 9/1982 | Lamarche | 192/213.1 |
| 4,475,640 A | | 10/1984 | Takeuchi et al. | |
| 5,908,099 A | * | 6/1999 | Kleifges | 192/70.17 |
| 6,231,449 B1 | * | 5/2001 | Youngerman et al. | 464/68.7 |
| 6,782,985 B2 | * | 8/2004 | Lohaus et al. | 192/70.17 |
| 6,830,139 B2 | * | 12/2004 | Carlson et al. | 192/70.17 |
| 2009/0120754 A1 | * | 5/2009 | Degler et al. | |

FOREIGN PATENT DOCUMENTS

| | | |
|---|---|---|
| DE | 4003076 A1 | 8/1991 |
| EP | 0200633 A1 | 11/1986 |
| WO | 9200470 A1 | 1/1992 |

* cited by examiner

*Primary Examiner* — Gregory Binda
*Assistant Examiner* — Josh Skroupa
(74) *Attorney, Agent, or Firm* — WRB-IP LLP

(57) ABSTRACT

A torsional vibration damper hub for a vehicle clutch includes a first row of springs extending substantially in the clutch rotating direction and disposed in openings formed in a first inner annular plate and a first pair of outer annular plates; a second row of springs extending substantially in the clutch rotating direction and is disposed in openings formed in the second inner annular plate and the second pair of outer annular plates; the first and second row of the springs being arranged on a same radius from a center of rotation of the clutch; the springs in the first row of springs arranged in one first axial level are axially overlapping the springs in the second row of springs arranged in a second axial level with the purpose to decrease a total axial length of the clutch. In an alternative embodiment the damper hub is substantially identical to a dual damper hub in conventional twin-plate clutches.

3 Claims, 4 Drawing Sheets

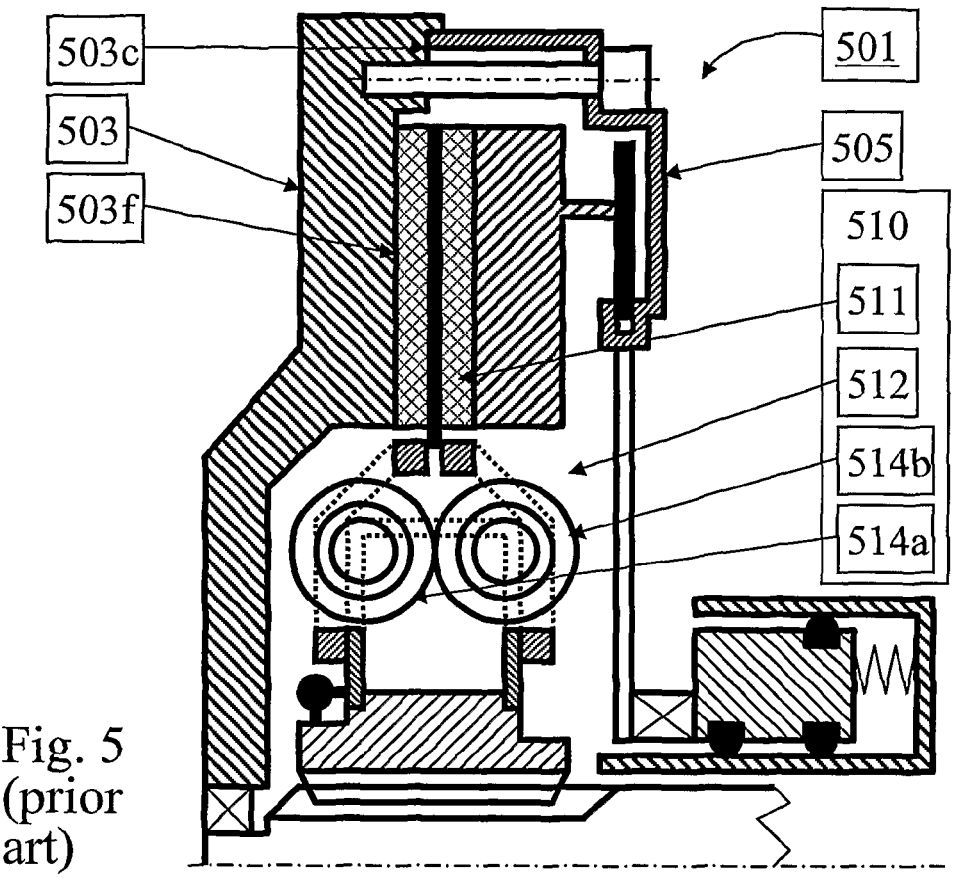
Fig. 5 (prior art)
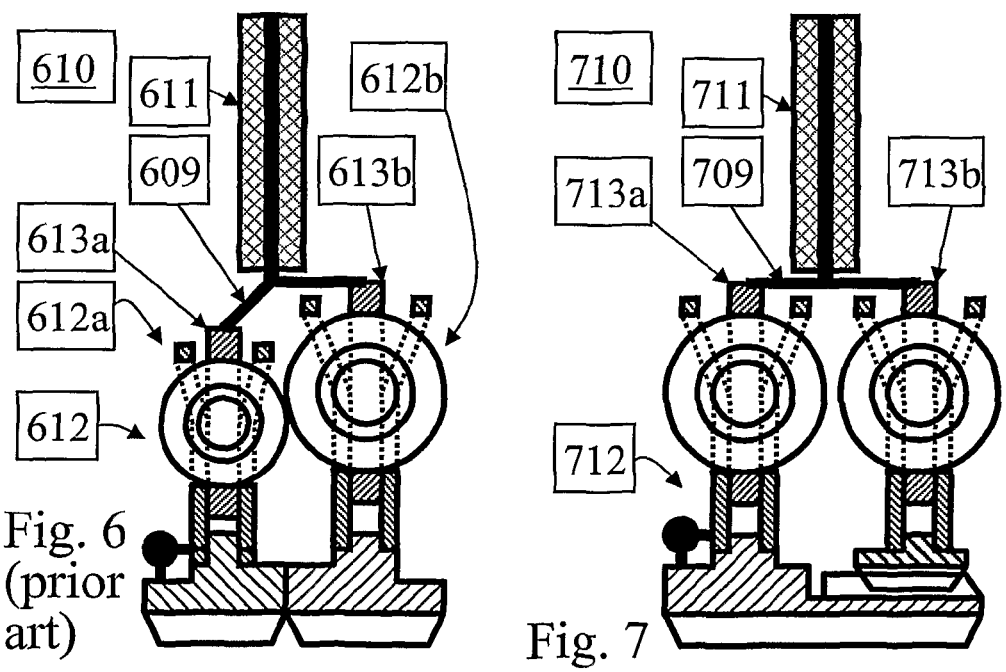
Fig. 6 (prior art)
Fig. 7

TORSIONAL VIBRATION DAMPER HUB FOR A VEHICLE CLUTCH

BACKGROUND AND SUMMARY

The present invention relates to vehicle transmissions, and more particularly to a system for improved performance of damper hubs in dry plate clutches.

Dry plate clutches are used in manual and automated vehicle transmissions to facilitate start-off from rest and disengage the transmission from the engine at gear shifts. In general, there is a damper hub integrated in a dry plate clutch. Adequately designed, this damper hub reduces torsional vibrations from the engine and spares the transmission. A damper hub usually has a number of helical springs arranged circumferentially on the driven disc that transfers torque from the engine flywheel to the input of the transmission. Some designs are shown in DE-10220205.

For heavy road vehicles, such as heavy trucks and buses, there has been a long-lasting trend towards more powerful engines. This poses technical challenges on the damper hubs to withstand higher engine torques and more severe torsional vibrations. For conventional simple damper hubs there is a limit on how large engine torques that can be handled. That limit has been increased by the use of helical springs of larger diameter that are located on a larger radius from the axis of rotation of the damper hub. Further such increases would imply a reduction of the friction lining area of the driven disc. That would, in turn, reduce the energy-absorbing ability as well as the life of the clutch. An alternative would be to increase the outer diameter of the clutch, which would make it difficult to fit the clutch in the chassis. Thus, these would be impractical ways to increase the torque capacity of the damper hub.

For higher engine torques, twin-disc clutches are frequently used. A typical design is shown in U.S. Pat. No. 6,782,985. Another example is shown by U.S. Pat. No. 1,935,459. In a twin-disc clutch there are two driven discs connected in parallel. Each of these discs has a damper hub. Thereby, each damper hub will be subjected to half the engine torque. Hence, very high engine torques can be handled by a twin-disc clutch. Unfortunately, twin-disc clutches are in general less attractive in terms of length, weight and cost. Moreover, compared to single-disc clutches they are more difficult to control. That makes twin-disc clutches unsuited for automated transmissions.

Another way to handle the torsional vibrations of powerful engines is by using a dual mass flywheel. In such a design, the flywheel is divided into two parts with a resilient damper in between. One design can be seen in WO-9427062. In a dual mass flywheel the damper springs can be located in a very efficient way. Thereby, it has the potential to handle large engine torques. It also allows the use of a single-disc clutch, which is of advantage for automated transmissions. On the other hand, dual mass flywheels are heavy and expensive. Since the flywheel is divided, the clutch is also likely to have reduced thermal capacity.

Another known solution for higher engine torques is to arrange two axially separated rows of springs in a single disc clutch. Thereby, the torsional vibration handling capacity of a twin-disc clutch is combined with the lower weight and cost along with ease of control of a single-disc clutch. Examples of such damper hubs in single disc clutches are disclosed in DE 19528319, WO9200470, U.S. Pat. No. 4,475,640, DE4040606 and U.S. Pat. No. 5,145,463. The cost for manufacturing these single-disc clutches are still higher compared to a conventional single-disc clutch with one row of springs. There is therefore a need to further slim the design. Another problem with known art is that two parallel rows of springs increases the axial length compared to a solution with a single row of springs.

So, there is a need for a single-disc dry plate clutch with increased ability to handle torsional vibrations but without the disadvantages regarding weight, cost and total axial length of prior art. In a first embodiment of the invention a design is provided where a torsional vibration damper hub for a vehicle clutch comprises a hub splined to a shaft; first and second inner annular plates rotatably fitted to an outer periphery of the hub, first and second pairs of outer annular plates arranged at both sides of said first and second inner annular plate respectively; first row of springs extending substantially in the clutch rotating direction and disposed in openings formed in said first inner annular plate and said first pair of outer annular plates; second row of springs extending substantially in the clutch rotating direction and disposed in openings formed in said second inner annular plate and said second pair of outer annular plates, each first and second pair of the outer annular plates being connected to the adjacent inner annular plate by said springs; said first and second pair of outer annular plate being connected to the hub; a torque input member including one single friction plate fixed to said first and second inner annular plate. The invention is characterized, according to an aspect thereof, in that the springs in said first row of springs arranged in one first axial level are axially overlapping the springs in said second row of springs arranged in a second axial level with the purpose to decrease a total axial length of said clutch. That will give a very compact design whose axial space requirements would not be significantly larger than for a conventional single-disc clutch.

In a second embodiment of the invention an axial distance between geometrical centres of one spring in said first row and one spring in said second row, is larger than one half of the outer diameter of said springs. In this context the diameter of said springs of said first and second row can be chosen to be substantially equal or substantially different, thus, in the latter case the axial total length of said clutch can be decreased even further.

In a further embodiment of said invention said damper hub is substantially identical to a dual damper hub in conventional twin-plate clutches. This embodiment of the invention can also be used in a torsional damper hub without having springs in a first and second row that are axially overlapping (as in the embodiment above), but instead having two rows of springs that are not axially overlapping. This would result in a fairly compact and cost-effective solution.

In a further embodiment of said invention said first and second row of said springs are arranged on a substantially same radius from centre of rotation of said clutch. Arranging said rows on the same radius would give the opportunity to maximize the possibility to handle high engine torques by the clutch.

BRIEF DESCRIPTION OF THE DRAWINGS

The invention will be exemplified by means of the enclosed drawings.

FIG. 5 shows a schematic longitudinal section of a clutch whose damper hub has two axially separated rows of springs according to prior art.

FIG. 6 shows a schematic longitudinal section of a driven disc according to prior art whose damper hub is composed of two damper hubs from conventional single-disc clutches.

FIG. 7 shows a schematic longitudinal section of a driven disc according to the invention whose damper hub is substantially a dual damper hub from a conventional twin-disc clutch.

DETAILED DESCRIPTION

Figure 1:
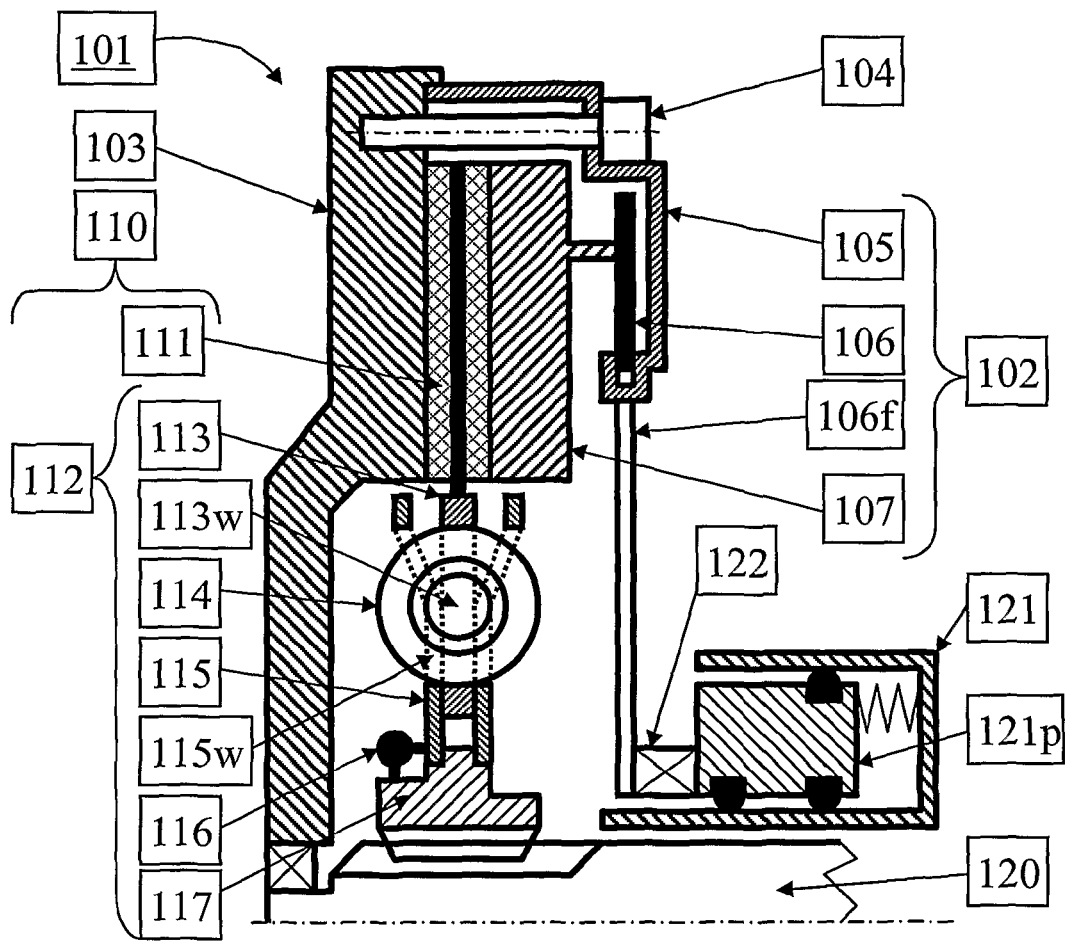
FIG. 1 shows a schematic longitudinal section of a conventional single-disc dry plate clutch with an integrated damper hub according to prior art.

FIG. 1 shows a simplified longitudinal section of a single-disc dry plate clutch 101 of prior art. There, a clutch cover assembly 102 is fastened to a flywheel 103 by means of screws 104. The clutch cover assembly 102 is composed of a clutch cover 105, a diaphragm spring 106 and a pressure plate 107. The diaphragm spring has fingers 106f extending radially inwards. A coupling device (not shown) rotationally connects the pressure plate 107 to the clutch cover 105 and allows a limited axial relative motion. Furthermore, there is a driven disc 110 that is composed of a friction plate 111 and a damper hub 112. An inner plate 113 of the damper hub 112 is connected fixedly to the friction plate 111. Spring packs 114 are carried in windows 113w in the inner plate 113. The spring packs 114 are also carried by outer plates 115 in corresponding windows 115w. Each spring pack 114 can be composed of a single helical spring or of two or more helical springs placed inside each other. The outer plates 115 are connected via a symbolically shown pre-damper 116 to an inner hub 117. Finally, the inner hub 117 is axially moveable but rotationally fixed to an input shaft 120 of a not shown transmission.

The clutch 101 is controlled by an actuator 121 whose piston 121p via a release bearing 122 pushes the fingers 106f of the diaphragm spring 106 for disengaging the clutch.

Figure 2:
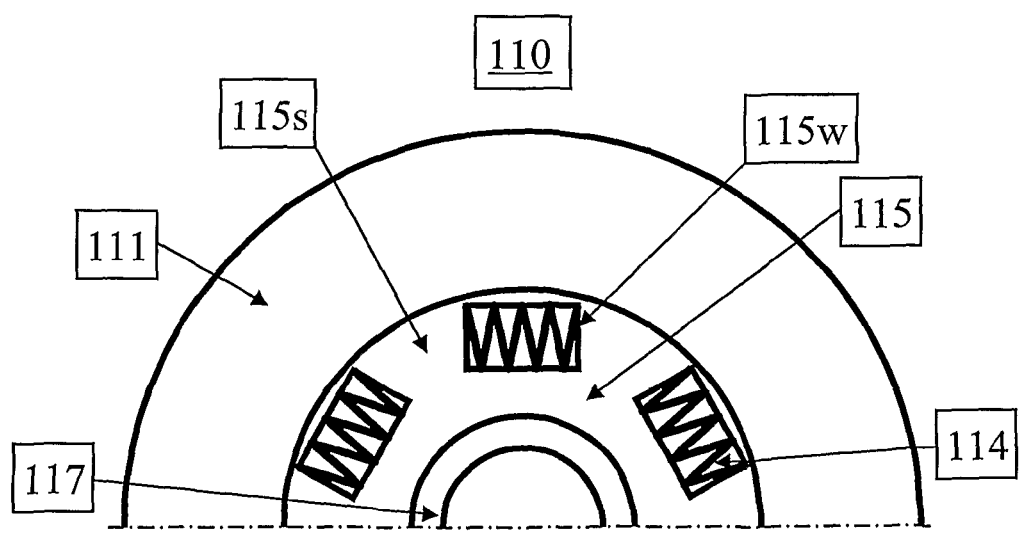
FIG. 2 shows an axial view of the conventional driven disc in FIG. 1.

FIG. 2 shows an axial view of the driven disc 110. It can be seen that there is a number of spring packs 114 arranged in corresponding windows 115w of the outer plates 115. In general, the larger the number of spring packs is, the larger torques can be handled by the driven disc.

When the clutch 101 is engaged, the diaphragm spring 106 urges the pressure plate 107 to clamp the friction plate 111 of the driven disc 110 towards the flywheel 103. Thereby, torque can be transferred from the flywheel 103 via the friction plate 111 to the inner plate 113. A relative angular motion between the inner plate 113 and the outer plates 115 will compress the spring packs 114. Thereby, at each instant the torque that is transferred is dependent on the compression of the spring packs 114. A large torque corresponds to a large compression, and vice versa. On the outer plates 115, the forces from the compressed spring packs 114 are carried by shoulders 115s between the windows 115w. For strength reasons, the shoulders 115s must be fairly wide. This will limit the width and number of windows 115w and the torque that can be handled. The corresponding applies to windows 113w of the inner plate 113.

Figure 3:
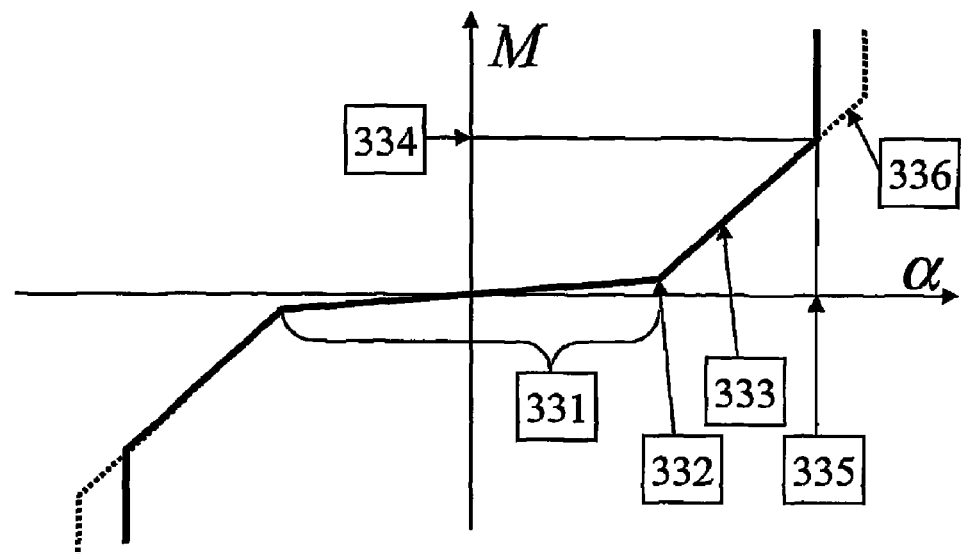
FIG. 3 shows a typical relationship between torque and relative rotational displacement for a damper hub like the one in FIG. 1.

FIG. 3 shows a typical relationship between transferred torque M and relative angular motion a between the inner plate 113 and the inner hub 117. At low levels of torque, area 331, the pre-damper 116 is active and allows a fairly large relative motion. That will reduce rattling noise from the gear meshes of the transmission when the engine is idling. At a certain point 332 the spring packs 114 start to compress. The transferred torque will then increase substantially linearly with the relative angular motion along line 333 up to a stop torque 334 where further compression of the spring packs 114 is mechanically blocked. The corresponding relative angular motion is referred to as the stop angle 335. In order to handle higher engine torques, as indicated by line 336, an increase is required of both the stop torque 334 and the stop angle 335, that is, the compression of the spring packs 114. Due to the strength reasons mentioned, such an increase is hardly feasible in a conventional single-disc clutch.

Figure 4:
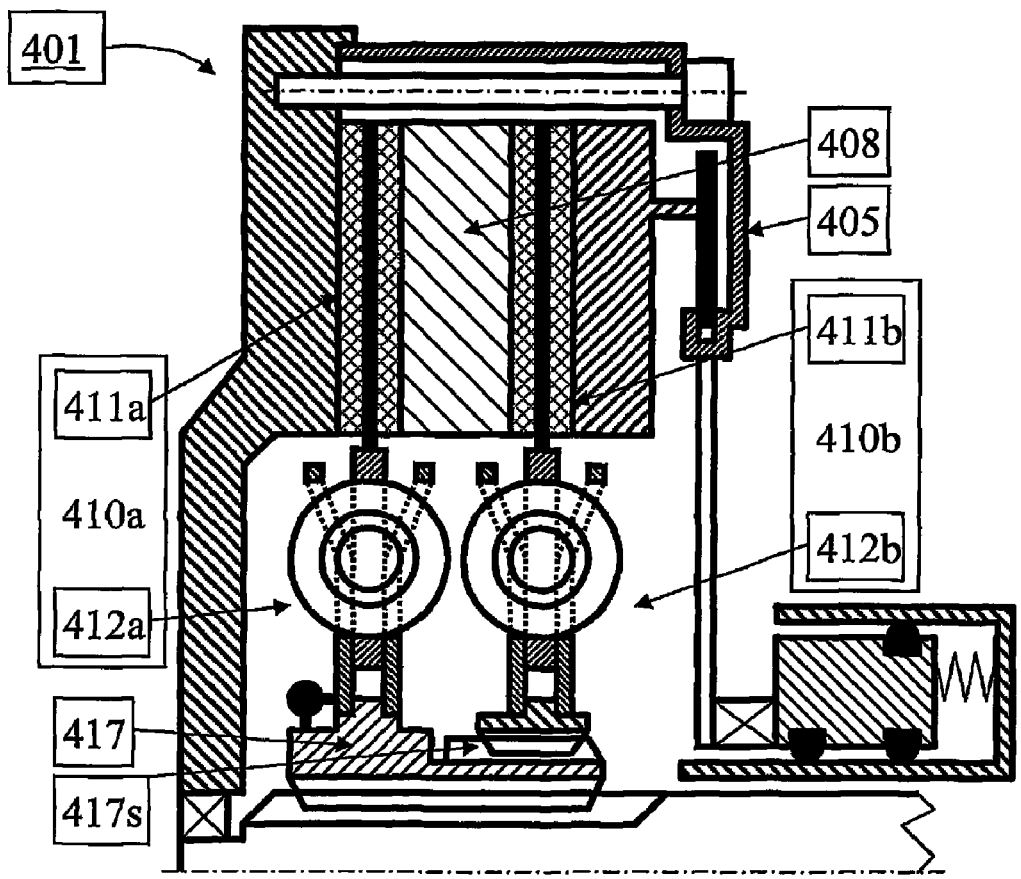
FIG. 4 shows a schematic longitudinal section of a conventional twin-disc clutch with a dual damper hub according to prior art.

FIG. 4 shows a twin-disc dry plate clutch 401 according to prior art. There, two substantially identical driven discs 410a, 410b are connected to a common inner hub 417. Each of the driven discs 410a and 410b has a damper hub 412a, 412b of similar design as the damper hub 112 in FIG. 1. A splined joint 417s allows a limited axial motion of the driven disc 410b relative the driven disc 410a. Thereby, dimensional tolerances and wear can be compensated for. Furthermore, between the friction plates 411a, 411b of the driven discs 410a, 410b there is an intermediate pressure plate 408 that is rotationally connected to the clutch cover 405. Basically, the number of spring packs is doubled in a twin-disc clutch 401 compared to a conventional single-disc clutch 101. Thus, higher engine torques can be handled. However, a twin-disc clutch 401 is considerably more expensive and heavy. In addition, more axial space is required, and the increased inertia resulting from the two friction plates 411a, 411b burdens the shift system. Moreover, twin-disc clutches are known to be more difficult to control in a precise way.

FIG. 5 shows a single-disc clutch 501 according to prior art having two axially separate rows of spring packs 514a, 514b in the damper hub 512 of the driven disc 510. The number of spring packs is doubled, giving a potential to handle large engine torques. In terms of weight and driven disc inertia, the clutch 501 substantially does not share the disadvantages of the twin-disc clutch 401. On the flywheel 503, the friction surface 503f, which faces the friction plate 511 of the driven disc 510, is axially separated from the abutment 503c that supports the clutch cover 505. Then, clutch covers from single-disc clutches may be used. On the other hand the damper hub 512 is purposely designed for a single disc clutch with two rows of spring packs, which means increased manufacturing costs compared to a conventional single disc clutch with one row of spring packs.

FIG. 6 shows an embodiment according to prior art. The damper hub 612 of the driven disc 610 is composed of a first damper hub 612a and a second damper hub 612b. The inner plates 613a, 613b of the damper hubs 612a, 612b are connected to the friction plate 611 by a connecting element 609. Both damper hubs 612a, 612b are substantially identical to damper hubs in single-disc clutches. Thereby, high-volume parts can be used. The damper hubs 612a, 612b can be of equal or different size. If of different size, as shown in FIG. 6, they can be packaged in a more compact way.

FIG. 7 shows an embodiment of the invention. The damper hub 712 of the driven disc 710 is substantially identical to a dual damper hub from a twin-disc clutch, like in FIG. 4. A connecting element 709 joins the inner plates 713a, 713b to the friction plate 711.

Figures 8, 9:
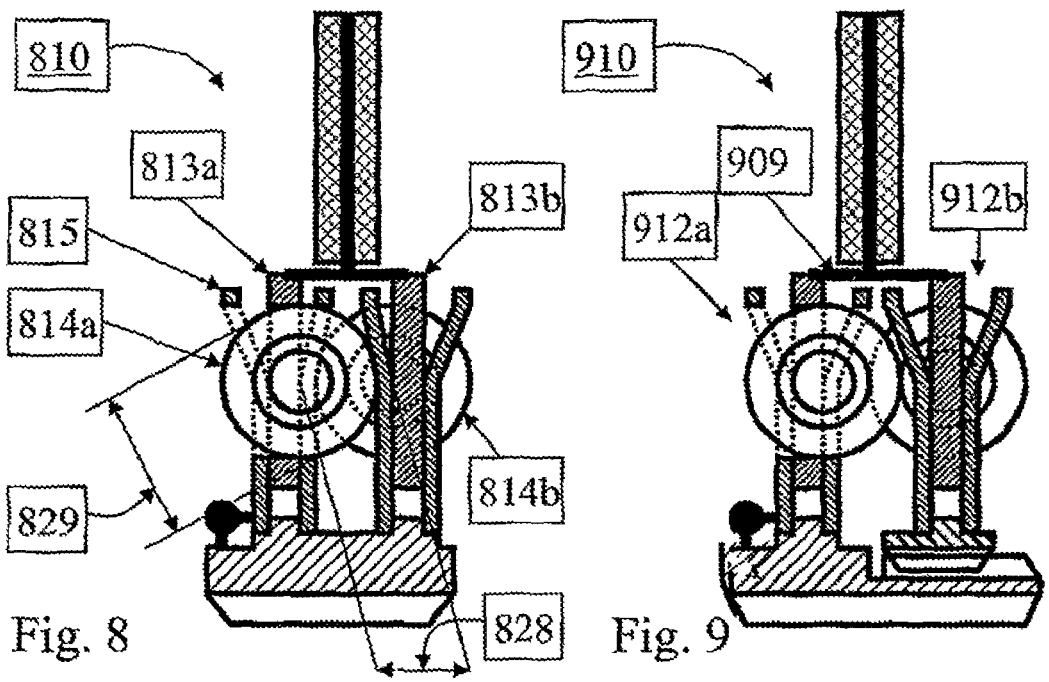
FIG. 8 shows a schematic longitudinal section of a driven disc according to the invention where the two rows of springs are partially overlapping each other axially.
FIG. 9 shows an alternative embodiment to the embodiment in FIG. 8, but where the damper hub is substantially a dual damper hub from a conventional twin-disc clutch.
Figure 10:
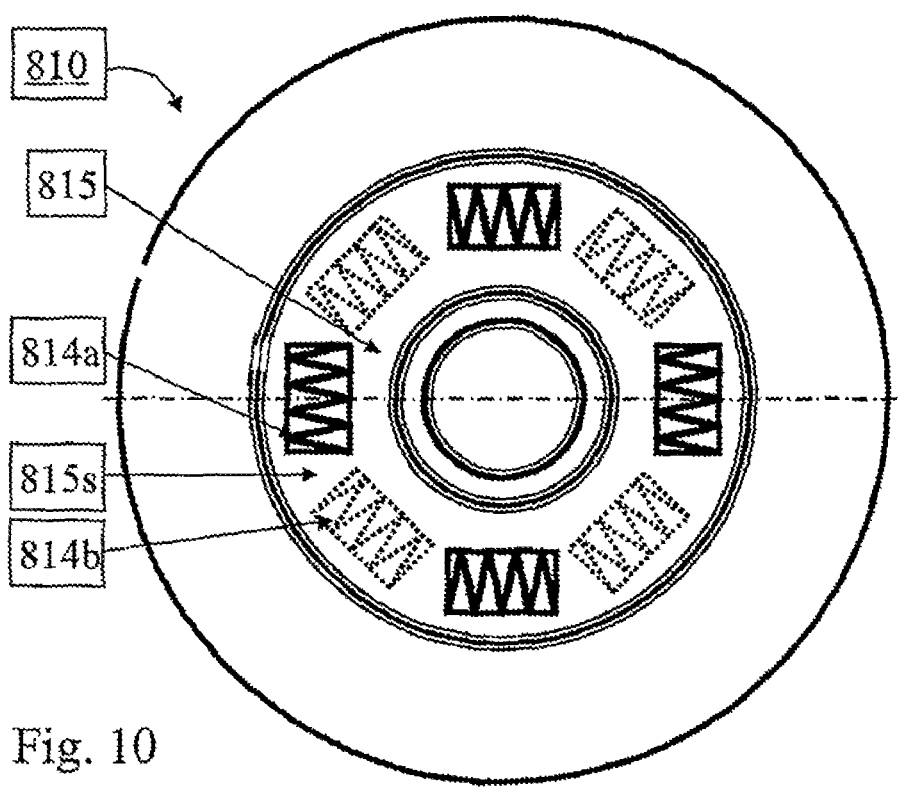
FIG. 10 shows an axial view from the left of the driven disc of FIG. 8 or 9.

The damper hubs 512, 612 and 712 in FIGS. 5 to 7 require fairly large amounts of axial space. FIG. 8 shows an embodiment of the invention where the two rows of spring packs 814a, 814b of the driven disc 810 are partly overlapping each other. That gives a very compact design in axial direction. The overlapping of the rows of spring packs 814a, 814b implies some requirements on the relative location in angular direction of the spring packs. In order to avoid interference, the spring packs of one of the rows must be located between the spring packs of the other row. This is shown in FIG. 10. There, the spring packs of row 814b are located in the same angular positions as the shoulders 815s of the outer plate 815 that carries the other row of spring packs 814a. As was discussed earlier, the shoulders 815s of the outer plate 815 (as well as the corresponding shoulders of the other plates that carry the spring packs) need a certain width in angular direction for strength reasons.

FIG. 9 shows an alternative embodiment of the embodiment in FIG. 8. Here, the damper hub 912a and 912b of the driven disc 910 is substantially identical to a dual damper hub from a twin-disc clutch, like in FIG. 4. A connecting element 909 joins the inner plates to the friction plate. Thus, a more standardized and cheaper design can be used. FIG. 10 can be used for an axial view from the left of the driven disc of the embodiment in FIG. 9, as well.

The design in FIGS. 8, 9 and 10 makes use of the width of the shoulders 815s for the other row of spring packs. In total, a larger part of the periphery can be used for spring packs. This is obvious when comparing FIGS. 2 and 10; there are six spring packs in FIG. 2, whereas there are eight in FIG. 10. That gives a potential to handle larger input torques.

The partial overlapping of the rows of spring packs 814a, 814b could be quantified by the centre distance 828 in axial direction. That centre distance should preferably be larger than one half of the outer diameter 829 of the spring packs. Thereby, there will be sufficient space available for inner plates 813a, 813b to carry the rows of spring packs 814a, 814b. Corresponding applies to the embodiment of FIG. 9.

In an alternative embodiment of the embodiments in FIGS. 8 and 9 respectively, one of the rows of spring packs could comprise springs with smaller diameter compared to the springs in the other row. This would make it possible to further decrease the total axial length of the clutch.

Another advantage in using the hub from a twin-disc clutch in the embodiments of FIGS. 7 and 9 is that the splined joint (corresponding to 417s in FIG. 4) admits easier accommodation to dimensional tolerances for the connecting element (709 and 909 respectively).

The invention should not be deemed to be limited to the embodiments described above, but rather a number of further variants and modifications are conceivable within the scope of the following patent claims.

The invention claimed is:

1. A torsional vibration damper hub for a vehicle clutch comprising
a hub splined to a shaft,
first and second inner annular plates rotatably fitted to an outer periphery of the hub,
first and second pairs of outer annular plates arranged at both sides of the first and second inner annular plates respectively,
a first row of springs extending substantially in a clutch rotating direction and disposed in openings formed in the first inner annular plate and the first pair of outer annular plates,
a second row of springs extending substantially in the clutch rotating direction and disposed in openings formed in the second inner annular plate and the second pair of outer annular plates,
each first and second pair of the outer annular plates being connected to the adjacent inner annular plate by the springs,
the first and second pair of outer annular plates being connected to the hub,
a torque input member including one single friction plate fixed to the first and second inner annular plates,
wherein the springs in the first row of springs are arranged in one first axial level and axially overlap the springs in the second row of springs, the springs in the second row of springs being arranged in a second axial level,
wherein the first and second row of the springs are arranged on a substantially same radius from a center of rotation of the clutch.

2. A torsional vibration damper hub as in claim 1, wherein an axial distance between geometrical centers of one spring in the first row and one spring in the second row is larger than one half of an outer diameter of the springs.

3. A torsional vibration damper hub as in claim 2, wherein the diameter of the springs of the first and second row are substantially equal.

* * * * *